US008476394B2

(12) United States Patent
St. Jean et al.

(10) Patent No.: US 8,476,394 B2
(45) Date of Patent: Jul. 2, 2013

(54) POLYMER RESINS HAVING IMPROVED BARRIER PROPERTIES AND METHODS OF MAKING SAME

(75) Inventors: Guylaine St. Jean, Bartlesville, OK (US); Qing Yang, Bartlesville, OK (US); Chung Tso, Bartlesville, OK (US); Max P. McDaniel, Bartlesville, OK (US)

(73) Assignee: Chevron Philips Chemical Company LP, The Woodlands, TX (US)

( * ) Notice: Subject to any disclaimer, the term of this patent is extended or adjusted under 35 U.S.C. 154(b) by 354 days.

(21) Appl. No.: 12/875,373

(22) Filed: Sep. 3, 2010

(65) Prior Publication Data

US 2012/0058324 A1    Mar. 8, 2012

(51) Int. Cl.
*C08F 210/02* (2006.01)
*C08F 210/00* (2006.01)

(52) U.S. Cl.
USPC ........... 526/348; 526/160; 526/170; 525/387; 525/333.8

(58) Field of Classification Search
USPC ......................................... 526/348, 352, 160
See application file for complete search history.

(56) References Cited

U.S. PATENT DOCUMENTS

| | | | |
|---|---|---|---|
| 3,248,179 A | 4/1966 | Norwood | |
| 4,501,885 A | 2/1985 | Sherk et al. | |
| 4,588,790 A | 5/1986 | Jenkins, III et al. | |
| 4,939,217 A | 7/1990 | Stricklen | |
| 5,191,132 A | 3/1993 | Patsidis et al. | |
| 5,210,352 A | 5/1993 | Alt et al. | |
| 5,347,026 A | 9/1994 | Patsidis et al. | |
| 5,352,749 A | 10/1994 | DeChellis et al. | |
| 5,399,636 A | 3/1995 | Alt et al. | |
| 5,401,817 A | 3/1995 | Palackal et al. | |
| 5,420,320 A | 5/1995 | Zenk et al. | |
| 5,436,304 A | 7/1995 | Griffin et al. | |
| 5,436,305 A | 7/1995 | Alt et al. | |
| 5,451,649 A | 9/1995 | Zenk et al. | |
| 5,455,314 A | 10/1995 | Burns et al. | |
| 5,496,781 A | 3/1996 | Geerts et al. | |
| 5,498,581 A | 3/1996 | Welch et al. | |
| 5,541,272 A | 7/1996 | Schmid et al. | |
| 5,554,795 A | 9/1996 | Frey et al. | |
| 5,563,284 A | 10/1996 | Frey et al. | |
| 5,565,175 A | 10/1996 | Hottovy et al. | |
| 5,565,592 A | 10/1996 | Patsidis et al. | |
| 5,571,880 A | 11/1996 | Alt et al. | |
| 5,575,979 A | 11/1996 | Hanson | |
| 5,594,078 A | 1/1997 | Welch et al. | |
| 5,631,203 A | 5/1997 | Welch et al. | |
| 5,631,335 A | 5/1997 | Alt et al. | |
| 5,654,454 A | 8/1997 | Peifer et al. | |
| 5,668,230 A | 9/1997 | Schertl et al. | |
| 5,705,579 A | 1/1998 | Hawley et al. | |
| 6,107,230 A | 8/2000 | McDaniel et al. | |
| 6,165,929 A | 12/2000 | McDaniel et al. | |
| 6,191,227 B1 * | 2/2001 | Matsuoka et al. | 525/240 |
| 6,239,235 B1 | 5/2001 | Hottovy et al. | |
| 6,262,191 B1 | 7/2001 | Hottovy et al. | |
| 6,294,494 B1 | 9/2001 | McDaniel et al. | |
| 6,300,271 B1 | 10/2001 | McDaniel et al. | |
| 6,316,553 B1 | 11/2001 | McDaniel et al. | |
| 6,355,594 B1 | 3/2002 | McDaniel et al. | |
| 6,376,415 B1 | 4/2002 | McDaniel et al. | |
| 6,391,411 B1 * | 5/2002 | Duckwall et al. | 428/35.7 |
| 6,391,816 B1 | 5/2002 | McDaniel et al. | |
| 6,395,666 B1 | 5/2002 | McDaniel et al. | |
| 6,432,496 B1 | 8/2002 | Klosiewicz | |
| 6,509,427 B1 | 1/2003 | Welch et al. | |
| 6,524,987 B1 | 2/2003 | Collins et al. | |
| 6,548,441 B1 | 4/2003 | McDaniel et al. | |
| 6,833,415 B2 | 12/2004 | Kendrick et al. | |
| 6,913,809 B2 | 7/2005 | Wolak | |
| 6,914,113 B2 * | 7/2005 | McLeod et al. | 526/352 |
| 6,984,698 B2 | 1/2006 | McLeod et al. | |
| 7,041,617 B2 * | 5/2006 | Jensen et al. | 502/113 |
| 7,176,259 B1 | 2/2007 | Klosiewicz | |
| 7,625,982 B2 * | 12/2009 | Martin et al. | 525/240 |

(Continued)

FOREIGN PATENT DOCUMENTS

WO      2007008361 A1    1/2007
WO   WO 2009/066689 A1 *  5/2009

OTHER PUBLICATIONS

International Search Report, PCT/US2011/049661, dated Dec. 5, 2011.
Bird, R. Byron, et al., "Fluid mechanics," Dynamics of Polymeric Liquids, 1987, vol. 1, 2nd edition, pp. xiii-xvii and 171-172, John Wiley & Sons.
Chevron Phillips Chemical Company LLC, "MarFlex® 9659 high density polyethylene," IDES Prospector, Feb. 23, 2010, 1 page, IDES.
Hieber, C. A., et al., "Shear-rate-dependence modeling of polymer melt viscosity," Polymer Engineering and Science, Jul. 1992, vol. 32, No. 14, pp. 931-938.
Hieber, C. A., et al., "Some correlations involving the shear viscosity of polystyrene melts," Rheologica Acta, 1989, vol. 28, pp. 321-332.
Lyondellbasell Industries, "Alathon® M6210 high density (MMW) polyethylene," IDES Prospector, Feb. 23, 2010, 1 page, IDES.

(Continued)

*Primary Examiner* — Rip A. Lee
(74) *Attorney, Agent, or Firm* — Conley Rose, P.C.; Rodney B. Carroll; Cheryl L. Huseman

(57) ABSTRACT

A polymeric resin having a lower molecular weight (LMW) component and a higher molecular weight (HMW) component and the resin having a density of from about 0.955 g/cc to about 0.967 g/cc, a melt index of from about 0.5 dg/min to about 4.0 dg/min, and a zero shear viscosity of from about $3.0 \times 10^3$ Pa-s to about $4.0 \times 10^4$ Pa-s. A method comprising providing a catalyst system comprising at least one transition metal complex, an activator support, and a cocatalyst; contacting the catalyst system with an olefin under conditions suitable to form a polyolefin, wherein the polyolefin has a HMW component and a LMW component; and recovering the polyolefin, wherein the polyolefin has a melt index of from about 0.5 dg/min to about 4.0 dg/min, and a zero shear viscosity of from about $3.0 \times 10^3$ Pa-s to about $4.0 \times 10^4$ Pa-s.

25 Claims, No Drawings

U.S. PATENT DOCUMENTS

| | | | |
|---|---|---|---|
| 7,632,907 B2 * | 12/2009 | Sukhadia et al. | 526/348.1 |
| 7,696,280 B2 * | 4/2010 | Krishnaswamy et al. | 525/240 |
| 7,951,881 B2 * | 5/2011 | Sukhadia et al. | 526/104 |
| 8,022,143 B2 * | 9/2011 | Wang | 525/191 |
| 2005/0239977 A1 * | 10/2005 | McDaniel et al. | 526/113 |
| 2006/0094590 A1 | 5/2006 | McDaniel et al. | |
| 2006/0155082 A1 | 7/2006 | McDaniel et al. | |
| 2007/0010626 A1 * | 1/2007 | Shankernarayanan et al. | 525/240 |
| 2007/0043182 A1 | 2/2007 | Martin et al. | |
| 2008/0004411 A1 | 1/2008 | Sukhadia et al. | |
| 2008/0118749 A1 | 5/2008 | Aubee et al. | |
| 2009/0035545 A1 | 2/2009 | Guenther et al. | |
| 2010/0029872 A1 | 2/2010 | Jensen et al. | |
| 2010/0041842 A1 | 2/2010 | Yang et al. | |
| 2010/0221475 A1 | 9/2010 | Sukhadia et al. | |
| 2010/0292421 A1 * | 11/2010 | Bando | 526/126 |

OTHER PUBLICATIONS

MarFlex Polyethylene, "MarFlex® 9659 high density polyethylene," Jun. 2004, 1 page, Chevron Phillips Chemical Company LP.

"Moisture vapor transmission rate," Wikipedia, Feb. 24, 2004, 3 pages.

"Product comparison," IDES Prospector, Feb. 23, 2010, 5 pages, IDES.

Shroff, R. N., et al., "Long-chain-branching index for essentially linear polyethylenes," Macromolecules, 1999, vol. 32, pp. 8454-8464, American Chemical Society.

* cited by examiner

POLYMER RESINS HAVING IMPROVED BARRIER PROPERTIES AND METHODS OF MAKING SAME

CROSS REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

The present disclosure generally relates to polymer resins having improved physical properties and methods of making and using same. Particularly, the present disclosure relates to polyethylene resins having improved barrier properties.

FIELD OF THE INVENTION

Polyolefins are plastic materials useful for making a wide variety of valued products due to their combination of stiffness, ductility, barrier properties, temperature resistance, optical properties, availability, and low cost. One of the most valued products is plastic films. In particular, PE is the one of the largest volume polymers consumed in the world. It is a versatile polymer that offers high performance relative to other polymers and alternative materials such as glass, metal, or paper. Plastic films such as PE films are mostly used in packaging applications but they also find utility in the agricultural, medical, and engineering fields.

PE films are manufactured in a variety of grades that are usually differentiated by the polymer density such that PE films can be designated, for example, low density polyethylene (LDPE), medium density polyethylene (MDPE), and high density polyethylene (HDPE), wherein each density range has a unique combination of properties making it suitable for a particular application.

Despite the many positive attributes of PE, the film product remains permeable to moisture (e.g., water). Thus, it would be desirable to develop a PE film product exhibiting improved barrier properties.

BRIEF SUMMARY OF THE INVENTION

Disclosed herein is a polymeric resin having a lower molecular weight (LMW) component and a higher molecular weight (HMW) component and the resin having a density of from about 0.955 g/cc to about 0.967 g/cc, a melt index of from about 0.5 dg/min to about 4.0 dg/min, and a zero shear viscosity of from about $3.0 \times 10^3$ Pa-s to about $4.0 \times 10^4$ Pa-s.

Also disclosed herein is a method comprising providing a catalyst system comprising at least one transition metal complex, an activator support, and a cocatalyst; contacting the catalyst system with an olefin under conditions suitable to form a polyolefin, wherein the polyolefin has a HMW component and a LMW component; and recovering the polyolefin, wherein the polyolefin has a melt index of from about 0.5 dg/min to about 4.0 dg/min, and a zero shear viscosity of from about $3.0 \times 10^3$ Pa-s to about $4.0 \times 10^4$ Pa-s.

DETAILED DESCRIPTION OF THE INVENTION

Disclosed herein are polymer compositions and methods of making and using same. In an embodiment, the polymer comprises polyethylene, alternatively high density polyethylene. Polymer compositions of the type described herein may be formed into films that display improved barrier properties and are hereinafter referred to as polymeric compositions having enhanced barrier properties (PC-EB). Such compositions and methods of making and using same are described in more detail herein.

In an embodiment, a method of preparing a PC-EB comprises contacting an alpha-olefin monomer with a catalyst system under conditions suitable for the formation of a polymer of the type described herein. Any catalyst system compatible with and able to produce polymers having the features disclosed herein may be employed. In an embodiment, the catalyst system comprises a transition-metal complex, an activator-support, and a cocatalyst each of which is described in more detail later herein. The terms "catalyst composition," "catalyst mixture," "catalyst system," and the like, do not depend upon the actual product resulting from the contact or reaction of the components of the mixtures, the nature of the active catalytic site, or the fate of the co-catalyst, the metallocene compound, any olefin monomer used to prepare a precontacted mixture, or the activator-support, after combining these components. Therefore, the terms "catalyst composition," "catalyst mixture," "catalyst system," and the like, can include both heterogeneous compositions and homogenous compositions.

In an embodiment, the catalyst system for preparation of a PC-EB comprises a transition metal complex, alternatively an organometallic complex, alternatively a metallocene complex. Herein, the term "metallocene" describes a compound comprising at least one if to $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands include hydrogen, therefore the description "substituted derivatives thereof" in this disclosure comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like.

Nonlimiting examples of metallocene compounds that may be suitably employed in a catalyst system for preparation of a PC-EB include bis(cyclopentadienyl)hafnium dichloride; 1,2-ethanediylbis($\eta^5$-indenyl)di-n-butoxyhafnium; 1,2-ethanediylbis($\eta^5$-1-indenyl)dimethylzirconium; 3,3-pentanediylbis(($\eta^5$-4,5,6,7-tetrahydro-1-indenyl)hafnium dichloride; methylphenylsilylbis($\eta^5$-4,5,6,7-tetrahydro-1-indenyl)zirconium dichloride; bis(n-butylcyclopentadienyl)bis(di-t-butylamido)hafnium; bis(n-butylcyclopentadienyl)zirconium dichloride; dimethylsilylbis(1-indenyl)zirconium dichloride; octylphenylsilylbis(1-indenyl)hafnium dichloride; dimethylsilylbis($\eta^5$-4,5,6,7-tetrahydro-1-indenyl)zirconium dichloride; dimethylsilylbis(2-methyl-1-indenyl)zirconium dichloride; 1,2-ethanediylbis(9-fluorenyl)zirconium dichloride; indenyl diethoxy titanium(IV) chloride; (isopropylamidodimethylsilyl)cyclopentadienyltitanium dichloride; bis(pentamethylcyclopentadienyl)zirconium dichloride; bis (indenyl)zirconium dichloride; methyloctylsilyl bis(9-fluorenyl)zirconium dichloride; bis-[1-(N,N-diisopropylamino) boratebenzene]hydridozirconium trifluoromethylsulfonate; or any combination thereof. In an embodiment, the metallocene compound comprises bis(indenyl)zirconium dichloride. Hereinafter the disclosure will refer to the use of bis (indenyl)zirconium dichloride although other transition metal complexes of the type described herein are also contemplated for use in this disclosure.

Processes to prepare metallocene compounds suitable for use in this disclosure are described, for example, in U.S. Pat. Nos. 4,939,217, 5,191,132, 5,210,352, 5,347,026, 5,399,636, 5,401,817, 5,420,320, 5,436,305, 5,451,649, 5,496,781, 5,498,581, 5,541,272, 5,554,795, 5,563,284, 5,565,592, 5,571,880, 5,594,078, 5,631,203, 5,631,335, 5,654,454, 5,668,230, 5,705,579, and 6,509,427 each of which is incorporated by reference herein, in its entirety A catalyst system for preparation of a PC-EB may further comprise an activator-support. In an embodiment, the activator-support includes the contact product of at least one solid oxide compound and at least one electron-withdrawing anion source. The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another.

In an embodiment, the solid oxide compound comprises an inorganic oxide. The activator-support may exhibit enhanced acidity as compared to the corresponding untreated solid oxide compound. The activator-support also functions as a catalyst activator as compared to the corresponding untreated solid oxide. In an embodiment, the activator-support comprises a solid inorganic oxide material, a mixed oxide material, or a combination of inorganic oxide materials, that is chemically-treated with an electron-withdrawing component, and optionally treated with a metal. Thus, the solid oxide of this disclosure encompasses oxide materials such as alumina, "mixed oxide" compounds thereof such as silica-alumina, and combinations and mixtures thereof.

In an embodiment, the activator-support comprises a sulfated solid oxide which comprises sulfate and a solid oxide component such as alumina or silica-alumina, in the form of a particulate solid. Various processes to prepare solid oxide activator-supports that are suitable for use in this disclosure are described in U.S. Pat. Nos. 6,107,230, 6,165,929, 6,294,494, 6,300,271, 6,316,553, 6,355,594, 6,376,415, 6,391,816, 6,395,666, 6,524,987, and 6,548,441, each of which is incorporated by reference herein, in its entirety.

A catalyst system for preparation of a PC-EB may further comprise a cocatalyst. In an embodiment, the cocatalyst comprises an organoaluminum compound, alternatively an alkylaluminum compound. For example, the cocatalyst may comprise a trialkylaluminum compound, having the general formula $AlR_3$. Nonlimiting examples of trialkylaluminum compounds suitable for use in this disclosure include trimethylaluminium, triethylaluminium, tripropylaluminium, tributylaluminium, triisobutylaluminium (TIBA), trihexylaluminium, and combinations thereof. Additionally, hydrolyzed alkylaluminum compounds, aluminoxanes, may be used. Catalyst systems suitable for use in this disclosure have been described, for example, in U.S. Patent Publication Nos. 2010/0029872, 2006/0094590, and 2010/0041842 each of which is incorporated by reference herein in its entirety.

The catalyst and catalyst systems disclosed herein are intended for any olefin polymerization method which may be carried out using various types of polymerization reactors. As used herein, "polymerization reactor" includes any polymerization reactor capable of polymerizing olefin monomers to produce homopolymers or copolymers. Such homopolymers and copolymers are referred to as resins or polymers.

The various types of reactors include those that may be referred to as batch, slurry, gas-phase, solution, high pressure, tubular, or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of un-reacted monomer, un-reacted co-monomer, and/or diluent.

Polymerization reactor systems of the present disclosure may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high pressure reactors, or a combination of high pressure with loop and/or gas reactors. The multiple reactors may be operated in series or in parallel.

According to one aspect of the disclosure, the polymerization reactor system may comprise at least one loop slurry reactor comprising vertical and/or horizontal loops. Monomer, diluent, catalyst and optionally any co-monomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or co-monomer. Various technologies may be used for this separation step including but not limited to, flashing that may include any combination of heat addition and pressure reduction; separation by cyclonic action in either a cyclone or hydrocyclone; or separation by centrifugation.

A typical slurry polymerization process (also known as the particle form process), is disclosed, for example, in U.S. Pat. Nos. 3,248,179, 4,501,885, 5,565,175, 5,575,979, 6,239,235, 6,262,191, and 6,833,415, each of which is incorporated by reference herein in its entirety.

Suitable diluents used in slurry polymerization include, but are not limited to, the monomer being polymerized and hydrocarbons that are liquids under reaction conditions.

Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this disclosure, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference herein in its entirety.

According to still another aspect of the disclosure, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the disclosure, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure, and the concentrations of various reactants. Polymerization temperature can affect catalyst productivity, polymer molecular weight and molecular weight distribution. Suitable polymerization temperature may be any temperature below the de-polymerization temperature according to the Gibbs Free energy equation. Typically, this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1000 psig. Pressure for gas phase polymerization is usually at about 200 to about 500 psig. High pressure polymerization in tubular or autoclave reactors is generally run at about 20,000 to about 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching and rheological measurements.

The concentrations of monomer, hydrogen, modifiers, and electron donors are important in producing these resin properties. Co-monomer is used to control product density. Hydrogen can be used to control product molecular weight. Modifiers can be used to control product properties and electron donors affect stereoregularity. In addition, the concentration of poisons is minimized because poisons impact the reactions and product properties. In an embodiment, hydrogen is added to the reactor during polymerization. Alternatively, hydrogen is not added to the reactor during polymerization.

The polymer or resin may be formed into various articles, including, but not limited to, bottles, drums, toys, household containers, utensils, film products, drums, fuel tanks, pipes, geomembranes, and liners. Various processes may be used to form these articles, including, but not limited to, blow molding, extrusion molding, rotational molding, injection molding, fiber spinning, thermoforming, cast molding, and the like. After polymerization, additives and modifiers can be added to the polymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

Catalysts and catalyst systems prepared in accordance with the present disclosure may be used for the polymerization of olefins, for example, alpha-olefins. In an embodiment, a catalyst or catalyst system of the type described herein is contacted with one or more olefins in a reaction zone under suitable reaction conditions (e.g., temperature, pressure, etc.) to polymerize the olefins. Linear or branched alpha-olefins having 2 to 30 carbon atoms can be used as the olefins raw material. Specific examples of the alpha-olefins may include ethylene, propylene, 1-butene, 1-hexene, 1-octene, 3-methyl-1-butene, 4-methyl-1-pentene, or the like. Such alpha-olefins may be used individually (e.g., to produce homopolymers) or in various combinations of two or more to produce co-polymers (e.g., di-polymers, tri-polymers, etc.). In an embodiment, the catalyst system described herein is used to produce polyethylene, for example, polyethylene homopolymer.

After polymerization, additives and modifiers can be added to the polymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

In an embodiment, a PC-EB of the type described herein comprises a polymer blend. The polymer blend may be of any type compatible with and able to produce a PC-EB of the type described herein. For example, the PC-EB may be a physical or mechanical blend of polymers, alternatively the PC-EB may be a reactor blend of polymers. In an embodiment, a process for the preparation of a PC-EB of the type disclosed herein comprises the preparation of each component of the PC-EB independent of the other components. The process may comprise polymerization of an alpha-olefin monomer in the presence of a catalyst system under a first set of reaction conditions to form a first component of the PC-EB. For example, the alpha-olefin monomer may comprise ethylene and the catalyst system may comprise (bis)indenyl zirconium dichloride, a sulfated alumina activator-support and an alkylaluminum cocatalyst. The process may further comprise polymerization of an alpha-olefin in the presence of a catalyst system under a second set of reaction conditions to form a second component of the PC-EB. As will be understood by one of ordinary skill in the art, adjustments of the reaction conditions to which the catalyst system is subjected during polymerization may substantively alter the resultant product. Further, such adjustments may be made by one of ordinary skill in the art with the benefits of this disclosure. A process for preparation of a PC-EB may further comprise contacting the first and second components utilizing any appropriate methodology (e.g., mechanical mixing). In such an embodiment, the resultant PC-EB comprises a physical blend of the first and second component.

Alternatively, a process for the preparation of a PC-EB of the type disclosed herein comprises polymerization of an alpha-olefin monomer in the presence of a catalyst system comprising at least two transition metal complexes. For example, the catalyst system may comprise a first and a second transition metal complex wherein the first and second transition metal complexes are different. In such embodiments, the first and/or second transition metal complex comprises a metallocene complex of the type described herein and results in the simultaneous formation of the two components of the PC-EB when both catalysts are employed in a single reactor. In the alternative, a first catalyst system comprising a first transition metal complex may be associated with a first reactor. Alpha-olefin mononomer may be contacted with the first catalyst system and reactor and conditions adjusted such that polymerization of the alpha-oelfin monomer results and a first component of the PC-EB is produced. The first component may then be contacted with a second catalyst system and alpha-olefin monomer under conditions to result in the polymerization of the alpha-olefin monomer and formation of the second component of the PC-EB. In such an embodiment, the components of the PC-EB are produced sequentially. In the aforementioned embodiments employing at least two transition metal complexes, the PC-EB formed may be described as a reactor blend of the two components.

It is to be understood in the disclosure that follows where features of the individual components are disclosed determination of these features were carried out on a single component independent of the contribution of the other component. For example, a first component may be recovered and its technical features analyzed prior to contacting with a second component.

A PC-EB of the type described herein may be a multimodal resin. Herein, the "modality" of a polymer resin refers to the form of its molecular weight distribution curve, i.e., the appearance of the graph of the polymer weight fraction as a function of its molecular weight. The polymer weight fraction refers to the weight fraction of molecules of a given size. A polymer having a molecular weight distribution curve showing a single peak may be referred to as a unimodal polymer, a polymer having a curve showing two distinct peaks may be referred to as bimodal polymer, a polymer having a curve showing three distinct peaks may be referred to as trimodal polymer, etc. Polymers having molecular weight distribution curves showing more than one peak may be collectively referred to as multimodal polymers or resins.

A PC-EB of the type described herein may have two or more components that may be distinguishable from one another, for example, based upon their individual composition and/or molecular weight distribution. A molecular weight distribution curve may be prepared for each individual component of the polymer resin. For example, the molecular weight distribution curve for the individual components of the polymer resin may display a single peak and thus be unimodal. The molecular weight distribution curves for the individual components may be superimposed onto a common chart to form the weight distribution curve for the polymer resin as a whole. Upon such superimposition, the resultant curve for the polymer resin as a whole may be multimodal or show n distinct peaks corresponding to n polymer components of differing molecular weight distributions. For example, a bimodal polymer resin may show two distinct peaks corresponding to two individual components. Such a bimodal polymer resin may have a first component that may be generally characterized as a higher molecular weight (HMW) polymer component and a second component that may be generally characterized as a lower molecular weight (LMW) polymer component. A trimodal polymer composition may show three distinct peaks corresponding to three individual polymer components. Alternatively, superimposition of the molecular weight distribution curves from the individual components may show a single peak that is broadened in comparison with the curves for the individual components corresponding to polymer fractions having different but overlapping molecular weight distributions. In an aspect, the PC-EB comprises a bimodal base resin comprising a LMW component and a HMW component. The remainder of the discussion will focus on a PC-EB bimodal resin with the understanding that other polymeric compositions, for example, having different modality, may be employed in various aspects and embodiments as would be suitable.

In an embodiment, the catalyst systems disclosed herein are used for the production of a PC-EB comprising a polyethylene polymer. The individual components of the PC-EB may comprise a homopolymer.

The HMW component of the PC-EB may be further characterized by a molecular weight of from about 120 kg/mol to about 365 kg/mol, alternatively from about 140 kg/mol to about 300 kg/mol, alternatively from about 150 kg/mol to about 250 kg/mol. The LMW component of the PC-EB may be further characterized by a molecular weight of from about 5 kg/mol to about 100 kg/mol, alternatively from about 8 kg/mol to about 50 kg/mol, alternatively from about 10 kg/mol to about 30 kg/mol.

The PC-EB may be characterized by the weight percentage of the components thereof. The PC-EB may have a HMW component present in a weight percentage based on the total weight of the composition of from about 20% to about 80%, alternatively from about 30% to about 70%, alternatively from about 40% to about 60% with the remainder of the composition comprising the LMW component.

The PC-EB may be characterized by the degree of branching present in the individual components and/or in the composition as a whole. Short chain branching (SCB) is known for its effects on polymer properties such as stiffness, tensile properties, heat resistance, hardness, permeation resistance, shrinkage, creep resistance, transparency, stress crack resistance, flexibility, impact strength, and the solid state properties of semi-crystalline polymers such as polyethylene, while long chain branching (LCB) exerts its effects on polymer rheology.

The HMW component of the PC-EB may contain equal to or less than about one long chain branch (LCB) per about 10,000 total carbon atoms (about $\frac{1}{10,000}$), alternatively equal to or less than about one LCB per about 100,000 total carbon atoms (about $\frac{1}{100,000}$), or alternatively equal to or less than about one LCB per about 1,000,000 total carbon atoms (about $\frac{1}{1,000,000}$). In an aspect, LCB in the HMW component of the polymer composition may be increased using any suitable methodology such as, for example, by treatment with peroxide or by selective control of the polymerization conditions. For example, a typical methodology for increasing LCB may involve adding a small quantity of peroxide of the class known as dialkyl peroxides (also called di-tertiary alkyl) to the HMW component to create a suitable amount of LCB resulting in better rheological performance. Examples of dialkyl peroxides include without limitation di-(t-butylperoxy)-diisopropylbenzene, dicumyl peroxide, 2,5-dimethyl-2,5-di-(t-butylperoxy)hexane, 2,5-dimethyl-2,5-di-(t-butylperoxy)hexyne-3 and combinations thereof. Other methodologies for increasing LCB include, for example, selective control of the polymerization conditions during the production of the PC-EB.

In an aspect, the HMW is treated to increase the LCB to greater than 0 to equal to or less than about 0.10, alternatively from about greater than 0 to about 0.08, alternatively from about greater than 0 to about 0.05.

The molecular weight distribution (MWD) of the PC-EB may be characterized by the ratio of the weight average molecular weight to the number average molecular weight, which is also referred to as the polydispersity index (PDI) or more simply as polydispersity. The number average molecular weight is the common average of the molecular weights of the individual polymers calculated by measuring the molecular weight of n polymer molecules, summing the weights, and dividing by n. The weight average molecular weight describes the molecular weight distribution of a polymer composition and is calculated according to Equation 1:

$$\overline{M}_w = \frac{\sum_i N_i M_i^2}{\sum_i N_i M_i} \quad (1)$$

where $N_i$ is the number of molecules of molecular weight $M_i$. All molecular weight averages are expressed in gram per mole (g/mol).

The individual components of the PC-EB (e.g., the LMW component and the HMW component) may have narrow molecular weight distributions (MWD). More specifically, the HMW component may have a PDI from about 1.8 to about 4.0, alternatively from about 2 to about 3.5, alternatively from about 2.3 to about 3.2. The LMW component may have a PDI of from about 1.8 to about 4.0, alternatively from about 2 to about 3.5, alternatively from about 2.3 to about 3.2. The resultant PC-EB composition (i.e. including both the LMW and HMW components) may have a broad MWD of from about 5 to about 12, alternatively from about 6 to about 10, alternatively from about 6.5 to about 7.5.

In an embodiment, a PC-EB of the type described herein is characterized by a density of from about 0.955 g/cc to about 0.967 g/cc, alternatively from about 0.958 g/cc to about 0.967 g/cc, alternatively from about 0.960 g/cc to about 0.966 g/cc as determined in accordance with ASTM D1505. For example, the PC-EB may be a high-density polyethylene having a density of greater than about 0.955 g/cc, alternatively greater than about 0.958 g/cc, alternatively greater than about 0.960 g/cc In an embodiment, a PC-EB produced using a catalyst of the type described herein has a melt index, MI, in the range of from about 0.5 dg/min to about 4 dg/min, alternatively from about 0.8 dg/min to about 2 dg/min, alternatively from about 1.0 dg/min to about 1.8 dg/min. The melt index (MI) refers to the amount of a polymer which can be forced through an extrusion rheometer orifice of 0.0825 inch diameter when subjected to a force of 2160 grams in ten minutes at 190° C., as determined in accordance with ASTM D1238.

In an embodiment, a PC-EB of the type described herein has a Carreau Yasuda 'a' parameter in the range of from about 0.4 to about 0.7, alternatively from about 0.45 to about 0.65, alternatively from about 0.5 to about 0.6. The Carreau Yasuda 'a' parameter (CY-a) is defined as the rheological breadth parameter. Rheological breadth refers to the breadth of the transition region between Newtonian and power-law type shear rate for a polymer or the frequency dependence of the viscosity of the polymer. The rheological breadth is a function of the relaxation time distribution of a polymer resin, which in turn is a function of the resin molecular structure or architecture. The CY-a parameter may be obtained by assuming the Cox-Merz rule and calculated by fitting flow curves generated in linear-viscoelastic dynamic oscillatory frequency sweep experiments with a modified Carreau-Yasuda (CY) model, which is represented by Equation (2):

$$E = E_o[1 + (T_\xi \dot{\gamma})^a]^{\frac{n-1}{a}} \quad (2)$$

where
E=viscosity (Pa·s)
$\dot{\gamma}$=shear rate (1/s)
α=rheological breadth parameter
$T_\xi$=relaxation time (s) [describes the location in time of the transition region]
$E_o$=zero shear viscosity (Pa·s) [defines the Newtonian plateau]
n=power law constant [defines the final slope of the high shear rate region]

To facilitate model fitting, the power law constant n is held at a constant value. Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987), each of which is incorporated by reference herein in its entirety.

In an embodiment, a PC-EB of the type described herein has a zero shear viscosity ($E_o$), defined by Equation (2), in the range of from about $3.0 \times 10^3$ Pa-s to about $4.0 \times 10^4$ Pa-s, alternatively from about $1.0 \times 10^4$ Pa-s to about $2.0 \times 10^4$ Pa-s, alternatively from about $1.2 \times 10^4$ Pa-s to about $1.5 \times 10^4$ Pa-s. The zero shear viscosity refers to the viscosity of the polymeric composition at a zero shear rate and is indicative of the materials molecular structure. Further, for polymer melts, the zero shear viscosity is often a useful indicator of processing attributes such as melt strength in blow-molding and foam technologies and bubble stability in film blowing. For example, the higher the zero shear viscosity, the better the melt strength or bubble stability.

In an embodiment, a PC-EB of the type described herein has a relaxation time ($\tau$), defined by Equation (2), in the range of from about 0.01 seconds to about 0.10 seconds, alternatively from about 0.015 seconds to about 0.08 seconds, alternatively from about 0.02 seconds to about 0.06 seconds. The relaxation rate refers to the viscous relaxation times of the polymer and is indicative of a distribution of relaxation times associated with the wide distribution of molecular weights.

In an embodiment, a PC-EB of the type described herein has a shear viscosity at 100 $s^{-1}$ ($E_{100}$), defined as the viscosity indicative of the head pressure during extrusion, in the range of from about $5.0 \times 10^2$ Pa-s to about $2.0 \times 10^3$ Pa-s, alternatively from about $7.0 \times^2$ Pa-s to about $1.7 \times 10^3$ Pa-s, alternatively from about $1.0 \times 10^3$ Pa-s to about $1.5 \times 10^3$ Pa-s. The $E_{100}$ is related to the ease of extrusion of the polymer resin during process such as film fabrication and is an indirect comparative measurement of the head pressure generated by melt extrusion of the polymer. In general a lower head pressure leads to a higher output rate (i.e., more pounds of material produced per hour of extrusion).

Polymer resins produced as disclosed herein may be formed into articles of manufacture or end use articles using any suitable technique such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. In an embodiment, the polymer resins produced as described herein (e.g., polyethylene) may be formed into films which can be useful in food packaging.

In an embodiment, the polymer resins of this disclosure are fabricated into a film. The films of this disclosure may be produced by any suitable method and under any suitable condition for the production of films. In an embodiment, the polymer resins are formed into films through a cast film process. In a cast film process, plastic melt is extruded through a slit die onto a chilled, polished roll to freeze the film. The speed of the roll controls the draw down ratio and film gauge. The film moves forward toward a second wounding roll where cooling is completed.

The films formed from polymer resins of this disclosure (e.g., polyethylene) may be of any thickness desired by the user. Alternatively, the polymer resins of this disclosure may be formed into films having a thickness of from about 0.3 mils (7 microns) to about 3 mils (76 microns), alternatively from about 0.5 mils (12 microns) to about 2 mils (50 microns), alternatively from about 0.8 mil (20 microns) to about 1.6 mils (40 microns).

Production of films of the type described herein may be facilitated by the use of polymeric resins prepared as described herein. For example, polymeric resins of the type described herein (i.e., PC-EB) when subjected to the film production process may display improved processing characteristics. In an embodiment, polymer resins of the type described herein may be extruded at a similar extrusion pressure when compared to polymer resin of similar melt index prepared with a dissimilar catalyst system. Such dissimilar catalysts may be conventional catalyst systems such as Ziegler Natta catalysts.

Additional observations in processing may include that polymer resins of the type described herein may be manufactured utilizing a motor load and head pressure similar to that of a resin produced using a dissimilar catalyst system. Herein, the head pressure refers to the discharge pressure at the end of the extruder while the motor load refers to horsepower draw of the extruder.

In an embodiment, the PC-EB comprises a polyethylene homopolymer which is formed into a film that displays enhanced barrier properties. For example said films may display reduced moisture vapor transmission rates (MVTR).

In an embodiment, a nominally 0.8 to 1.0 mil thick blown film produced from polymer resins of this disclosure has a gage-normalized MVTR in the range of from about 0.30 g·mil per 100 square inch per day (g·mil/100 $in^2$/day) to about 0.85 g·mil/100 $in^2$/day, alternatively from about 0.30 g·mil/100 $in^2$/day to about 0.60 g·mil/100 $in^2$/day, or alternatively from about 0.30 g·mil/100 $in^2$/day to about 0.50 g·mil/100 $in^2$/day as measured in accordance with ASTM F1249. The MVTR measures passage of gaseous $H_2O$ through a barrier. The MVTR may also be referred to as the water vapor transmission rate (WVTR). Typically, the MVTR is measured in a special chamber, divided vertically by the substrate/barrier material. A dry atmosphere is in one chamber, and a moist atmosphere is in the other. A 24-hour test is run to see how much moisture passes through the substrate/barrier from the "wet" chamber to the "dry" chamber under conditions which can specify any one of five combinations of temperature and humidity in the "wet" chamber.

While embodiments of this disclosure have been shown and described for cast film operations it is expected that when comparing compositions of the present disclosure to commercial resins, the disclosed improved MVTR performance (i.e., reduced MVTR values), similar extrusion performance and bubble stability will be maintained when other film operations are employed.

EXAMPLES

The subject matter having been generally described, the following examples are given as particular embodiments of the disclosure and to demonstrate the practice and advantages thereof. It is understood that the examples are given by way of illustration and are not intended to limit the specification of the claims to follow in any manner. In the following examples, following extrusion of the resin into film, MVTR was measured in accordance with ASTM F1249. For example, following the extrusion of the resin into film, the actual measurement of MVTR is performed using a Mocon Permatran machine (model W 3/31) testing system or equivalent. The Mocon instrument for measuring water permeability was developed by Modern Controls, Inc. To accomplish the MVTR measurement, a 10×10 cm sample is cut from a random area of the film. The sample is then mounted in a sample test cell and placed in the Mocon Permatran W3/31 unit. In the unit, the test film is exposed to a constant continuous flow of dry nitrogen gas across one side of the film (exhaust side) and a constant flow of controlled humidity nitrogen gas across the other side (carrier side). Water vapor passes from the humidified nitrogen side of the test cell through the film and into the dry nitrogen side of the test cell. A modulated infra-red photo-detection system on the exhaust side of the test cell measures the variation in absorption of infra-red energy caused by the water vapor which has transmitted through the film. By comparing the amplitude of the output signal obtained from the infra-red photo-detection system mounted on the test cell with the amplitude of a signal from a reference cell in the same instrument containing a film with a known transmission rate, the transmission rate of the test film is determined. By convention, the value obtained from MVTR is expressed as grams of water transmitted per 100 square inches per one mil (one thousandth of an inch) thickness in a 24-hour period (or, in metric system, grams of water transmitted per square meter per mm thickness in a 24-hour period).

In the following examples the indicated polymer characteristics were determined in accordance with the following referenced standard methodologies:

| Parameter | Methodology |
|---|---|
| Molecular weight | GPC |
| Density | ASTM D1505 |
| MI | ASTM D1238 |

All rheological parameters were determined based on the Carreau-Yasuda equation.

All polymerization runs were conducted in a one-gallon (3.785 liter) stainless steel reactor. Two liters of isobutane and alkyl aluminum cocatalyst/scavenger were used in all examples. Metallocene solutions (1 mg/mL) were usually prepared by dissolving 30 mg of metallocene in 30 mL of toluene. A typical polymerization procedure is as follows: Alkyl aluminum, SSA and the metallocene solution were added in that order through a charge port while venting isobutane vapor. The charge port was closed and two liters of isobutane were added. The contents of the reactor were stirred and heated to the desired run temperature. Ethylene was fed on demand to maintain the specified pressure for the specified length of the polymerization run. If hydrogen is required in the polymerization, hydrogen was fed with ethylene at a fixed ratio through whole run. The reactor was maintained at the desired run temperature through the run by an automated heating-cooling system. At the completion of the run time the ethylene and hydrogen flow were stopped and the reactor pressure slowly vented off. When the pressure and temperature were safely low enough the reactor was opened and the polymer powder collected.

Example 1

Resins produced using a catalyst system of the type described herein were obtained and tested for their film performance. Particularly, samples were prepared using a catalyst system comprising bis(indenyl)zirconium dichloride, a sulfated solid oxide activator-support and TIBA as the cocatalyst. The reagent amounts and reaction conditions for each sample are presented in Table 1. For each sample 200 mg of sulfated alumina and 0.6 mLs/1M of TIBA was used. Hydrogen in a 340 ml vessel was used in the production of Samples 1 to 4 and 6 to 10 while in Sample 5 the hydrogen used was stored in a 2 liter vessel. The amount of solid PE obtained along with the MI and HLMI of the solid PE are also reported in Table 1. The results demonstrate that PC-EBs of type described herein may be produced using the disclosed catalyst systems.

TABLE 1

| No. | Catalyst Wt. (mg) | Rxn Time (min) | Rxn Temp (° C.) | $C_2$ (psig) | $H_2$ (340 ml) (delta psi) | Solid PE (g) | MI dg/min | HLMI dg/min | Type of MW |
|---|---|---|---|---|---|---|---|---|---|
| 1 | 2.0 | 30 | 95 | 420 | 76.01 | 191.0 | >150 | >500 | LMW |
| 2 | 2.0 | 60 | 95 | 420 | 192.38 | 586.0 | >150 | >500 | LMW |
| 3 | 2.0 | 60 | 95 | 420 | 151.27 | 589.0 | >150 | >500 | LMW |
| 4 | 2.0 | 60 | 95 | 420 | 131.13 | 543.0 | >150 | >500 | LMW |
| 5 | 2.0 | 60 | 95 | 420 | 7.18 | 556.0 | >150 | >500 | LMW |
| 6 | 2.0 | 60 | 95 | 420 | 132.11 | 539.0 | >150 | >500 | LMW |
| 7 | 2.0 | 60 | 95 | 420 | 47.55 | 187.0 | >150 | >500 | LMW |
| 8 | 2.0 | 60 | 95 | 420 | 81.79 | 417.0 | >150 | >500 | LMW |
| 9 | 2.0 | 60 | 95 | 420 | 96.93 | 495.0 | >150 | >500 | LMW |
| 10 | 2.0 | 60 | 95 | 420 | 108.43 | 592.0 | >150 | >500 | LMW |
| 11 | 2.0 | 60 | 90 | 450 | 0 | 482.0 | 0.16 | 3.46 | HMW |
| 12 | 2.0 | 60 | 85 | 365 | 0 | 273.0 | 0.13 | 3.30 | HMW |
| 13 | 2.0 | 60 | 85 | 365 | 0 | 345.0 | 0.18 | 3.85 | HMW |
| 14 | 2.0 | 60 | 90 | 390 | 0 | 355.0 | 0.21 | 4.60 | HMW |
| 15 | 2.0 | 60 | 90 | 390 | 0 | 412.0 | 0.27 | 4.75 | HMW |
| 16 | 2.0 | 60 | 90 | 390 | 0 | 543.0 | 0.28 | 5.45 | HMW |
| 17 | 2.0 | 60 | 90 | 390 | 0 | 495.0 | 0.28 | 5.55 | HMW |
| 18 | 2.0 | 60 | 90 | 390 | 0 | 398.0 | 0.24 | 4.80 | HMW |
| 19 | 1.8 | 50 | 90 | 390 | 0 | 450.0 | 0.20 | 4.59 | HMW |
| 20 | 1.8 | 60 | 90 | 390 | 0 | 422.0 | 0.29 | 5.08 | HMW |
| 21 | 2.0 | 60 | 90 | 390 | 0 | 342.0 | 0.28 | 5.18 | HMW |
| 22 | 1.8 | 60 | 90 | 390 | 0 | 349.0 | 0.20 | 4.42 | HMW |
| 23 | 1.8 | 60 | 90 | 390 | 0 | 444.0 | 0.23 | 4.70 | HMW |
| 24 | 1.8 | 60 | 90 | 390 | 0 | 429.0 | 0.21 | 4.47 | HMW |
| 25 | 1.8 | 60 | 90 | 390 | 0 | 423.0 | 0.23 | 4.80 | HMW |
| 26 | 1.8 | 60 | 90 | 390 | 0 | 411.0 | 0.23 | 4.80 | HMW |
| 27 | 1.8 | 60 | 90 | 390 | 0 | 374.0 | 0.13 | 4.25 | HMW |
| 28 | 1.8 | 60 | 90 | 390 | 0 | 366.0 | 0.23 | 4.64 | HMW |
| 29 | 1.8 | 60 | 90 | 390 | 0 | 508.0 | 0.17 | 4.37 | HMW |
| 30 | 1.8 | 60 | 90 | 390 | 0 | 406.0 | 0.23 | 4.58 | HMW |
| 31 | 2.0 | 60 | 90 | 390 | 0 | 452.0 | 0.21 | 4.10 | HMW |
| 32 | 2.0 | 60 | 90 | 390 | 0 | 350.0 | 0.26 | 5.09 | HMW |
| 33 | 2.0 | 60 | 90 | 390 | 0 | 315.0 | 0.21 | 4.70 | HMW |

Example 2

The barrier properties of samples from Example 1 were investigated. Particularly, the MVTR and zero shear viscosity were determined for Samples 2 and 6 of Example 1 and comparative resins 1 and 2, hereinafter designated CR1 and CR2. Sample 2 contained 60% of a LMW component (MW=26 kg/mol) and 40% of a HMW component (MW=250 kg/mol) while Sample 6 contained 60% of a LMW component (MW=26 kg/mol) and 40% of a HMW component (MW=220 kg/mol). CR1 is a commercial resin produced using a chromium catalyst while CR2 is a commercial resin produced using a Ziegler Natta catalyst. The samples were formed into 1 mil gauge cast film. Table 2 presents the MVTR, reduction in MVTR, zero shear viscosity, MI and density of the samples. The reduction in MVTR is in comparison to CR2.

TABLE 2

| Sample No. | Normalized MVTR (g-mil/ 100 in²-day) | Reduction in MVTR in Percent | Zero Shear Viscosity (Dynamic Rheology at 190° C.) Pa-s | MI (2.16 kg) dg/min | Density (g/cc) |
|---|---|---|---|---|---|
| 2 | 0.50 | −23 | 4.9 × 10³ | 2.0 | 0.965 |
| 6 | 0.40 | −38 | 3.3 × 10³ | 2.8 | 0.965 |
| CR1 | 0.75 | 15 | 9.2 × 10⁴ | 1.0 | 0.964 |
| CR2 | 0.65 | — | 3.8 × 10⁴ | 1.0 | 0.959 |

The results demonstrate that PC-EBs of the type described herein exhibit a marked reduction in MVTR when compared to other PE resins of similar density.

Additional rheological analysis of Sample 6 and CR2 were carried out. Table 3 provides a comparison of the zero shear viscosity ($E_0$), the shear stress ($\tau$), the CY-a parameter, the viscosity ($E_{100}$), and MI of the two samples.

TABLE 3

| Sample | $E_0$ (Pa-s) | $\tau$ (s) | CY-a | $E_{100}$ (Pa-s) | MI (dg/min) |
|---|---|---|---|---|---|
| CR2 | 3.8E + 04 | 0.1820 | 0.2548 | 1.01 × 10³ | 0.96 |
| 6 | 3.3E + 03 | 0.0216 | 0.5442 | 8.14 × 10² | 2.81 |

The results indicate that Sample 6 had a $E_{100}$ that would result in a similar extrusion behavior and overall properties in the manufacturing process when compared to the commercial resins.

Example 3

The effects of the introduction of LCB on the MVTR of a polymer of the type described herein was investigated. Particularly, samples comprising 40% of a LMW component (MW=20 kg/mol) and 60% of a HMW component (MW=180 kg/mol), designated Sample 34, or 60% of a LMW component (MW=20 kg/mol) and 40% of a HMW component (MW=180 kg/mol), designated Sample 35, were prepared. The samples were reacted with either 0, 51.5 ppm or 102.2 ppm of dicumyl peroxide or 2,5-dimethyl-2,5-di-(t-butylperoxy) hexane as indicated in Table 4. Rheological analysis of the samples was carried out and the results are also presented in Table 4.

TABLE 4

| Formulation | $E_0$ (Pa-s) | $\tau$ (s) | CY-a | MI (dg/min) | $E_{100}$ (Pa-s) |
|---|---|---|---|---|---|
| Sample 34 (no peroxide) | 6.0 × 10³ | 0.021 | 0.5798 | 1.4 | 1.6 × 10³ |
| Sample 35 (no peroxide) | 2.1 × 10³ | 0.015 | 0.5985 | 4.6 | 6.6 × 10² |
| Sample 34 + 51.5 ppm peroxide | 6.3 × 10³ | 0.021 | 0.5475 | 1.4 | 1.6 × 10³ |
| Sample 35 + 51.5 ppm peroxide | 2.1 × 10³ | 0.015 | 0.5867 | 4.6 | 6.6 × 10² |
| Sample 34 + 102.2 ppm peroxide | 8.9 × 10³ | 0.023 | 0.4196 | 1.2 | 1.6 × 10³ |
| Sample 35 + 102.2 ppm peroxide | 2.6 × 10³ | 0.016 | 0.5204 | 4.0 | 7.1 × 10² |

The results demonstrate an increase in the zero shear viscosity (i.e., $E_0$) with increasing peroxide when comparing samples having identical compositions but treated with different amounts of peroxide. However, samples having 60 wt. % LMW component (i.e., Sample 35) appeared to have a strong impact on the zero shear viscosity regardless of the extent of LCB. Further a comparison of Sample 34 (with the added peroxide) and Sample 6 of Example 1 to CR2 shows that Sample 34 (having 40% of a LMW component and more LCB) had a zero shear viscosity that was between that of Sample 6 of Example 1 and CR2 indicating a better bubble stability during a blown film extrusion. In addition, the expected extrusion pressure of Sample 34 (indicated by $E_{100}$) and its melt index (MI) are within range of those of CR2, a commercial product. Additionally, Sample 34 displayed a reduction in MVTR of when compared to CR2.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A polymeric resin having a lower molecular weight (LMW) component and a higher molecular weight (HMW) component and the resin having a density of from about 0.955 g/cc to about 0.967 g/cc, a melt index of from about 0.5 dg/min to about 4.0 dg/min, a zero shear viscosity of from about $3.0 \times 10^3$ Pa-s to about $4.0 \times 10^4$ Pa-s and a CY-a parameter of from about 0.4 to about 0.7.

2. The resin of claim 1 wherein the HMW component has a weight average molecular weight of from about 120 kg/mol to about 365 kg/mol.

3. The resin of claim 1 wherein the LMW component has a weight average molecular weight of from about 5 kg/mol to about 100 kg/mol.

4. The resin of claim 1 wherein the percentage of HMW is from about 20 wt % to about 80 wt % based on the total weight of the resin.

5. The resin of claim 1 wherein the HMW component has long chain branching in the range greater than about 0 to equal to or less than about 0.10 per about 10,000 carbon atoms.

6. The resin of claim 1 having a polydispersity index of from about 5 to about 12.

7. The resin of claim 1 having a melt index of from about 0.8 dg/min to about 2 dg/min.

8. The resin of claim 1 having a relaxation time of from about 0.01 s to about 0.10 s.

9. The resin of claim 1 having a $E_{100}$ of from about $5.0 \times 10^2$ Pa-s to about $2.0 \times 10^3$ Pa-s where $E_{100}$ is the viscosity at 100 $s^{-1}$.

10. A film produced from the resin of claim 1.

11. The film of claim 10 having a thickness of from about 0.3 mil to about 3 mil.

12. The film of claim 10 having a moisture vapor transmission rate of from about 0.30 g·mil/100 in$^2$/day to about 0.85 g·mil/100 in$^2$/day.

13. A polymeric resin having a lower molecular weight (LMW) component and a higher molecular weight (HMW) component and the resin having a density of from about 0.955 g/cc to about 0.967 g/cc, a melt index of from about 0.5 dg/min to about 4.0 dg/min, a zero shear viscosity of from about $3.0 \times 10^3$ Pa-s to about $4.0 \times 10^4$ Pa-s and a CY-a parameter of from about 0.4 to about 0.7, wherein a film produced from the polymeric resin and having a thickness of from about 0.3 mil to about 3 mil has a moisture vapor transmission rate of from about 0.30 g·mil/100 in$^1$/day to about 0.85 g·mil/100 in$^2$/day.

14. A method comprising:
(a) providing a catalyst system comprising at least one transition metal complex, an activator support, and a cocatalyst;
(b) contacting the catalyst system with an olefin under conditions suitable to form a polyolefin, wherein the polyolefin has a higher molecular weight (HMW) component and a lower molecular weight (LMW) component; and
(c) recovering the polyolefin, wherein the polyolefin has a melt index of from about 0.5 dg/min to about 4.0 dg/min, a zero shear viscosity of from about $3.0 \times 10^3$ Pa-s to about $4.0 \times 10^4$ Pa-s and a CY-a parameter of from about 0.4 to about 0.7.

15. The method of claim 14 wherein the olefin comprises ethylene and the polyolefin comprises polyethylene.

16. The method of claim 15 wherein the polyethylene has a density of from about 0.955 g/cc to about 0.967 g/cc.

17. The method of claim 15 wherein the polyethylene has a HMW component having a weight average molecular weight of from about 120 kg/mol to about 365 kg/mol.

18. The method of claim 15 wherein the polyethylene has a LMW component having a weight average molecular weight of from about 5 kg/mol to about 100 kg/mol.

19. The method of claim 14 further comprising producing a cast film from the polyolefin.

20. The method of claim 19 wherein the cast film has a moisture vapor transmission rate of from about 0.30 g·mil/100 in$^2$/day to about 0.85 g·mil/100 in$^2$/day.

21. The method of claim 19 further comprising forming the film into a food packaging item.

22. The method of claim 14 wherein the catalyst system comprises at least two metallocenes and the resin comprises a blend of polymers.

23. The method of claim 22 wherein the blend of polymers is a physical blend, a reactor blend, or combinations thereof.

24. The method of claim 14 further comprising treating the HMW component to increase long chain branching.

25. The method of claim 24 wherein treating the HMW component to increase long chain branching comprises contacting the HMW component with a dialkyl peroxide.

* * * * *